United States Patent
Graham et al.

(10) Patent No.: US 12,349,614 B2
(45) Date of Patent: Jul. 8, 2025

(54) AIR SEEDING TURN COMPENSATION USING YAW RATE FROM SENSOR ON TOWING VEHICLE

(71) Applicant: Deere & Company, Moline, IL (US)

(72) Inventors: William D. Graham, East Moline, IL (US); Robert T. Casper, Davenport, IA (US); Ray M. Scheufler, Johnston, IA (US)

(73) Assignee: Deere & Company, Moline, IL (US)

( * ) Notice: Subject to any disclaimer, the term of this patent is extended or adjusted under 35 U.S.C. 154(b) by 750 days.

(21) Appl. No.: 17/523,448

(22) Filed: Nov. 10, 2021

(65) Prior Publication Data
US 2023/0143025 A1 May 11, 2023

(51) Int. Cl.
A01B 69/00 (2006.01)
A01B 69/08 (2006.01)
A01C 7/08 (2006.01)

(52) U.S. Cl.
CPC .......... *A01B 69/004* (2013.01); *A01B 69/006* (2013.01); *A01C 7/081* (2013.01)

(58) Field of Classification Search
None
See application file for complete search history.

(56) References Cited

U.S. PATENT DOCUMENTS

| 5,025,951 A | 6/1991 | Hook et al. |
| 5,956,255 A | 9/1999 | Flamme |
| 6,070,538 A | 6/2000 | Flamme et al. |
| 6,079,340 A | 6/2000 | Flamme et al. |
| 6,283,679 B1 | 9/2001 | Gregor et al. |
| 6,285,938 B1 | 9/2001 | Lang et al. |
| 6,584,920 B1 | 7/2003 | Cresswell |
| 7,373,890 B2 | 5/2008 | Kowalchuk |
| 7,395,769 B2 | 7/2008 | Jensen |
| 7,555,990 B2 | 7/2009 | Beaujot |
| 7,726,251 B1 | 6/2010 | Peterson et al. |
| 7,775,167 B2 | 8/2010 | Stehling et al. |
| 8,001,914 B2 | 8/2011 | Peterson et al. |
| 8,132,521 B2 | 3/2012 | Snipes et al. |
| 8,141,504 B2 | 3/2012 | Dean et al. |

(Continued)

FOREIGN PATENT DOCUMENTS

| CA | 2221403 A1 | 5/1999 |
| CA | 2311698 A1 | 12/2001 |

(Continued)

OTHER PUBLICATIONS

Extended European Search Report and Written Opinion issued in European Patent Application No. 22200304.8, dated Mar. 24, 2023, in 8 pages.

(Continued)

*Primary Examiner* — Christian Chace
*Assistant Examiner* — Shayne M. Gilbertson
(74) *Attorney, Agent, or Firm* — Joseph R. Kelly; KELLY, HOLT & CHRISTENSON, P.L.L.C.

(57) ABSTRACT

A yaw rate is sensed on a towing vehicle that is towing an air seeder. The sensed yaw rate is used to predict a future yaw rate on a planting implement of the air seeder. An application rate of material is varied across the application implement based upon the predicted yaw rate across the implement.

19 Claims, 11 Drawing Sheets

(56) References Cited

U.S. PATENT DOCUMENTS

| | | | |
|---|---|---|---|
| 8,196,534 | B2 | 6/2012 | Meyer et al. |
| 8,434,416 | B2 | 5/2013 | Kowalchuk et al. |
| 8,504,310 | B2 | 8/2013 | Landphair et al. |
| 8,522,700 | B2 | 9/2013 | Landphair |
| 8,578,870 | B2 | 11/2013 | Beaujot |
| 8,649,942 | B2 | 2/2014 | Mitchell |
| 8,671,857 | B2 | 3/2014 | Kowalchuk et al. |
| 8,683,931 | B1 | 4/2014 | Lafferty |
| 8,850,997 | B2 | 10/2014 | Silbernagel et al. |
| 8,857,353 | B2 | 10/2014 | Kowalchuk |
| 8,869,718 | B2 | 10/2014 | Binsirawanich et al. |
| 8,893,630 | B2 | 11/2014 | Kowalchuk |
| 9,031,749 | B2 | 5/2015 | Hubalek et al. |
| 9,043,950 | B2 | 6/2015 | Wendte et al. |
| 9,119,338 | B2 | 9/2015 | Alsäter et al. |
| 9,120,359 | B2 * | 9/2015 | Chiu .................. B60D 1/30 |
| 9,144,190 | B2 | 9/2015 | Henry et al. |
| 9,148,990 | B2 | 10/2015 | Redman et al. |
| 9,232,690 | B2 | 1/2016 | Kowalchuk |
| 9,237,687 | B2 | 1/2016 | Sauder et al. |
| 9,271,439 | B2 | 3/2016 | Bourgault et al. |
| 9,320,192 | B2 | 4/2016 | Steffen et al. |
| 9,398,739 | B2 | 7/2016 | Silbernagel et al. |
| 9,445,540 | B2 | 9/2016 | Ballu |
| 9,521,804 | B2 | 12/2016 | Wendte et al. |
| 9,585,305 | B2 | 3/2017 | Henry et al. |
| 9,609,803 | B2 | 4/2017 | Gervais et al. |
| 9,615,506 | B2 | 4/2017 | Ruppert et al. |
| 9,635,802 | B2 | 5/2017 | Rains et al. |
| 9,733,634 | B2 | 8/2017 | Prickel |
| 9,781,878 | B2 | 10/2017 | Montag |
| 9,788,475 | B2 | 10/2017 | Henry |
| 9,804,608 | B2 | 10/2017 | Chahley et al. |
| 9,894,829 | B2 | 2/2018 | Shivak |
| 9,913,424 | B2 | 3/2018 | Henry |
| 9,936,625 | B2 | 4/2018 | Wendte et al. |
| 10,058,021 | B2 | 8/2018 | Barsi et al. |
| 10,136,573 | B1 | 11/2018 | Arnett et al. |
| 10,143,127 | B2 | 12/2018 | Wilhelmi et al. |
| 10,149,428 | B2 | 12/2018 | Wendte et al. |
| 10,159,177 | B2 | 12/2018 | Gervais et al. |
| 10,244,674 | B2 | 4/2019 | Kinzenbaw et al. |
| 10,321,624 | B2 | 6/2019 | Reich et al. |
| 10,368,477 | B2 | 8/2019 | Radtke et al. |
| 10,375,876 | B2 | 8/2019 | Kordick |
| 2009/0314191 | A1 | 12/2009 | Friggstad |
| 2010/0106378 | A1 * | 4/2010 | O'Dea .................. B60T 8/17551 701/48 |
| 2010/0307394 | A1 | 12/2010 | Snipes et al. |
| 2011/0054743 | A1 | 3/2011 | Kocer et al. |
| 2011/0189440 | A1 | 8/2011 | Appleby et al. |
| 2012/0103238 | A1 | 5/2012 | Beaujot et al. |
| 2012/0169495 | A1 | 7/2012 | Kowalchuk |
| 2012/0174845 | A1 | 7/2012 | Friggstad |
| 2012/0239241 | A1 * | 9/2012 | Nesbitt ............... B60T 8/17551 701/29.2 |
| 2012/0325131 | A1 | 12/2012 | Thompson et al. |
| 2013/0192503 | A1 | 8/2013 | Henry et al. |
| 2013/0231823 | A1 * | 9/2013 | Wang .................. A01D 43/086 701/32.4 |
| 2014/0084081 | A1 | 3/2014 | Kunz et al. |
| 2017/0135280 | A1 | 5/2017 | Rosengren et al. |
| 2017/0325399 | A1 | 11/2017 | Heinrich et al. |
| 2018/0000008 | A1 | 1/2018 | Henry |
| 2018/0153093 | A1 | 6/2018 | Koch et al. |
| 2018/0184579 | A1 | 7/2018 | Wendte et al. |
| 2018/0206396 | A1 | 7/2018 | Roberge et al. |
| 2018/0255698 | A1 | 9/2018 | Korosi et al. |
| 2018/0288934 | A1 | 10/2018 | Shivak |
| 2018/0310468 | A1 | 11/2018 | Schoeny et al. |
| 2018/0338409 | A1 | 11/2018 | Heathcote |
| 2018/0359909 | A1 | 12/2018 | Conrad et al. |
| 2019/0000011 | A1 | 1/2019 | Gervais et al. |
| 2019/0037765 | A1 | 2/2019 | Bartelson et al. |
| 2019/0050002 | A1 | 2/2019 | Engel et al. |
| 2019/0082585 | A1 | 3/2019 | Felton et al. |
| 2019/0098827 | A1 | 4/2019 | Gilbert et al. |
| 2019/0183038 | A1 | 6/2019 | Kowalchuk |
| 2019/0200518 | A1 | 7/2019 | Kinzenbaw et al. |
| 2019/0235535 | A1 | 8/2019 | Schoeny et al. |
| 2019/0246551 | A1 | 8/2019 | Campbell et al. |
| 2023/0217849 | A1 * | 7/2023 | Meyer .................. A01B 69/004 701/50 |

FOREIGN PATENT DOCUMENTS

| | | |
|---|---|---|
| CA | 2398143 A1 | 2/2004 |
| CA | 2884186 A1 | 9/2012 |
| CA | 3008829 A1 | 7/2013 |
| CA | 2841515 A1 | 8/2015 |
| CA | 2949571 A1 | 5/2018 |
| CA | 3097708 A1 | 5/2021 |
| DE | 3310424 A1 | 9/1984 |
| DE | 19723370 A1 | 12/1998 |
| DE | 10154726 A1 | 5/2003 |
| DE | 102004030240 A1 | 2/2005 |
| DE | 102004030240 B4 | 7/2015 |
| DE | 102016012254 A1 | 4/2018 |
| DE | 102017103640 A1 | 8/2018 |
| DE | 102017005094 A1 | 11/2018 |
| EP | 0379231 A2 | 7/1990 |
| EP | 0219015 B1 | 5/1992 |
| EP | 0910939 A1 | 4/1999 |
| EP | 0997064 A2 | 5/2000 |
| EP | 2374342 A1 | 10/2011 |
| EP | 2876993 A1 | 6/2015 |
| EP | 2959762 A1 | 12/2015 |
| EP | 2966965 A1 | 1/2016 |
| EP | 3236208 A1 | 10/2017 |
| EP | 3278646 A1 | 2/2018 |
| EP | 3338524 A1 | 6/2018 |
| EP | 3400765 A1 | 11/2018 |
| EP | 3409090 A1 | 12/2018 |
| EP | 3525567 A1 | 8/2019 |
| EP | 2615901 B1 | 9/2020 |
| WO | 2012170545 A2 | 12/2012 |

OTHER PUBLICATIONS

Hemisphere GPS, A325 GNSS Smart Antenna, Feb. 2012, 2 pages.
Vaderstad, Seed Hawk brochure Jun. 2020, 40 pages.
Vaderstad, Seed Hawk, Seeding has evolved, May 2017, 8 pages.
Hemisphere/A222, GNSS Smart Antenna, Jul. 2019, 2 pages.
Concord Seeding Equipment Full Line 2020 https://www.amityseeding.ru/media/1538/concord_full-line_brochure Jun. 5, 2019, 32 pages.
Precision Air Series 5 Air Cart Brochure Jan. 2021, 16 pages.
Deere introduces redesigned N500C Air Drill with ProSeries™ Openers for small-grains producers, https://www.deere.com.au/en/news/all-news/redesigned-n500c-air-drill-proseries-openers/ [Retrieved on Sep. 4, 2024] Jun. 14, 2019, 3 pages.

* cited by examiner

AIR SEEDING TURN COMPENSATION USING YAW RATE FROM SENSOR ON TOWING VEHICLE

FIELD OF THE DESCRIPTION

The present description relates to agricultural equipment. More specifically, the present description relates to a system for performing seeding turn compensation by sensing yaw rate on a towing vehicle.

BACKGROUND

There are a wide variety of different types of agricultural equipment that can be used to plant seeds or apply other commodities to a field. Such equipment can include planters which have row units. Each row unit has a seed tank that carries seed that is to be planted by that row unit. The seed is metered and singulated from the tank on each row unit and can be dropped into a furrow created by the row unit or it can be actively moved to the furrow. Other equipment can include air seeders. Air seeders have a central seed or commodity tank. The seed or commodity tank is metered and delivered to furrows through tubes using air delivery. The furrows are opened by a furrow opener.

When applying seed or fertilizer or other materials, it is important to apply the correct amount per acre. Over-seeding can result in wasted product, while under-seeding can result in lower yield per acre than the field could otherwise support. For fertilizer, over application can result in damage to the plant, while under-application can reduce the efficacy of the application.

As a planting tool (or seeding tool) travels around a curve, the outer end of the seeding tool moves over the field more quickly than the inner end of the seeding tool. Therefore, if a static seeding rate is maintained during a curve, than the outer portion of the seeding tool under-seeds while the inner portion of the seeding tool over-seeds. Therefore, some seeding tools include curve compensation functionality. This type of functionality varies the seeding rate across the seeding tool while seeding around a corner, such as around the borders of the field and when going around water holes in the field, and other obstacles. The seed rate is varied in order to more closely obtain a uniform seeding rate on the ground. Therefore, the seed delivery rate is controlled to be higher on the part of the seeding tool that is navigating the outer part of the turn and lower on the part of the seeding tool that is navigating the inner part of the turn.

Some current curve compensation functionality uses a yaw rate sensor mounted on the seeding tool frame or speed sensors mounted on the extremities of the seeding tool frame. The instantaneous yaw rate is used to compensate the speed of the seed meter to vary the planting rate as the planting tool travels around the curve.

The discussion above is merely provided for general background information and is not intended to be used as an aid in determining the scope of the claimed subject matter.

SUMMARY

A yaw rate is sensed on a towing vehicle that is towing an air application implement. The sensed yaw rate is used to predict a future yaw rate on the air application implement. An application rate of material is varied across the application implement based upon the predicted yaw rate across the implement.

Example 1 is an agricultural system, comprising:

a towing vehicle;

an agricultural machine, coupled to the towing vehicle, including an application tool that applies material to a field at work points distributed along a transverse axis of the application tool;

an instantaneous yaw rate detector detecting an instantaneous yaw rate of the towing vehicle;

a tool yaw rate prediction system predicting, based on the instantaneous yaw rate detected on the towing vehicle, a plurality of different yaw rate values, each predicted yaw rate value of the plurality of different predicted yaw rate values corresponding to each work point of a set of the work points distributed along the transverse axis of the application tool; and a meter controller generating a control signal to control a meter that controls a rate at which the material is provided to the work points based on the plurality of different predicted yaw rate values.

Example 2 is the agricultural system of any or all previous examples wherein the agricultural machine comprises:

an air cart that provides the material to the application tool through the meter.

Example 3 is the agricultural system of any or all previous examples and further comprising:

a yaw rate aggregator aggregating a plurality of detected instantaneous yaw rates to obtain a set of aggregated instantaneous yaw rates.

Example 4 is the agricultural system of any or all previous examples wherein the tool yaw rate prediction system is configured to predict, based on the aggregated instantaneous yaw rates, the plurality of different yaw rate values.

Example 5 is the agricultural system of any or all previous examples wherein the tool yaw rate prediction system comprises:

a curve/table accessing system configured to access a pre-defined correlation that correlates instantaneous yaw rate values to predicted yaw rate values to obtain the plurality of different predicted yaw rate values.

Example 6 is the agricultural system of any or all previous examples wherein the tool yaw rate prediction system comprises:

a runtime calculation system configured to perform a run time calculation based on the instantaneous yaw rate values to obtain the plurality of different predicted yaw rate values.

Example 7 is the agricultural system of any or all previous examples wherein the meter controller comprises:

a curve/table accessing system configured to access a pre-defined correlation that correlates predicted yaw rate values to control signal values to obtain the control signal.

Example 8 is the agricultural system of any or all previous examples wherein the meter controller comprises:

a runtime calculation system configured to perform a run time calculation based on the predicted yaw rate values to obtain the control signal.

Example 9 is the agricultural system of any or all previous examples wherein the instantaneous yaw rate detector comprises:

a wheel angle detector configured to detect a wheel angle of a wheel on the towing vehicle.

Example 10 is the agricultural system of any or all previous examples wherein the instantaneous yaw rate detector comprises:

a steering wheel angle detector configured to detect a steering wheel angle of a steering wheel on the towing vehicle.

Example 11 is a computer-implemented method of controlling an agricultural machine, comprising:

detecting, on a towing vehicle, an instantaneous yaw rate of the towing vehicle, the towing vehicle towing an application tool that applies material to a field at work points distributed along a transverse axis of the application tool;

predicting, based on the instantaneous yaw rate detected on the towing vehicle, a plurality of different yaw rate values, each predicted yaw rate value of the plurality of different predicted yaw rate values corresponding to each work point of a set of the work points distributed along the transverse axis of the application tool; and generating a control signal to control a meter that controls a rate at which the material is provided to the work points based on the plurality of different predicted yaw rate values.

Example 12 is the computer-implemented method of any or all previous examples and further comprising:

aggregating a plurality of detected instantaneous yaw rates to obtain a set of aggregated instantaneous yaw rates.

Example 13 is the computer-implemented method of any or all previous examples wherein predicting comprises:

predicting, based on the aggregated instantaneous yaw rates, the plurality of different yaw rate values.

Example 14 is the computer-implemented method of any or all previous examples wherein predicting comprises:

accessing a pre-defined correlation that correlates instantaneous yaw rate values to predicted yaw rate values to obtain the plurality of different predicted yaw rate values.

Example 15 is the computer-implemented method of any or all previous examples wherein predicting comprises:

performing a run time calculation based on the instantaneous yaw rate values to obtain the plurality of different predicted yaw rate values.

Example 16 is the computer-implemented method of any or all previous examples wherein generating a control signal comprises:

accessing a pre-defined correlation that correlates predicted yaw rate values to control signal values to obtain the control signal.

Example 17 is the computer-implemented method of any or all previous examples wherein generating a control signal comprises:

performing a run time calculation based on the predicted yaw rate values to obtain the control signal.

Example 18 is the computer-implemented method of any or all previous examples wherein detecting an instantaneous yaw rate of the towing vehicle comprises:

detecting a wheel angle of a wheel on the towing vehicle.

Example 19 is the computer-implemented method of any or all previous examples wherein detecting an instantaneous yaw rate of the towing vehicle comprises:

detecting a steering wheel angle of a steering wheel on the towing vehicle.

Example 20 is a computer system, comprising:

at least one processor; and a data store storing computer executable instructions which, when executed by the at least one processor, causes the at least one processor to perform steps to control an agricultural machine, comprising:

receiving an instantaneous yaw rate of the towing vehicle, the towing vehicle towing an application tool that applies material to a field at work points distributed along a transverse axis of the application tool;

predicting, based on the instantaneous yaw rate detected on the towing vehicle, a plurality of different yaw rate values, each predicted yaw rate value of the plurality of different predicted yaw rate values corresponding to each work point of a set of the work points distributed along the transverse axis of the application tool; and generating a control signal to control a meter that controls a rate at which the material is provided to the work points based on the plurality of different predicted yaw rate values.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
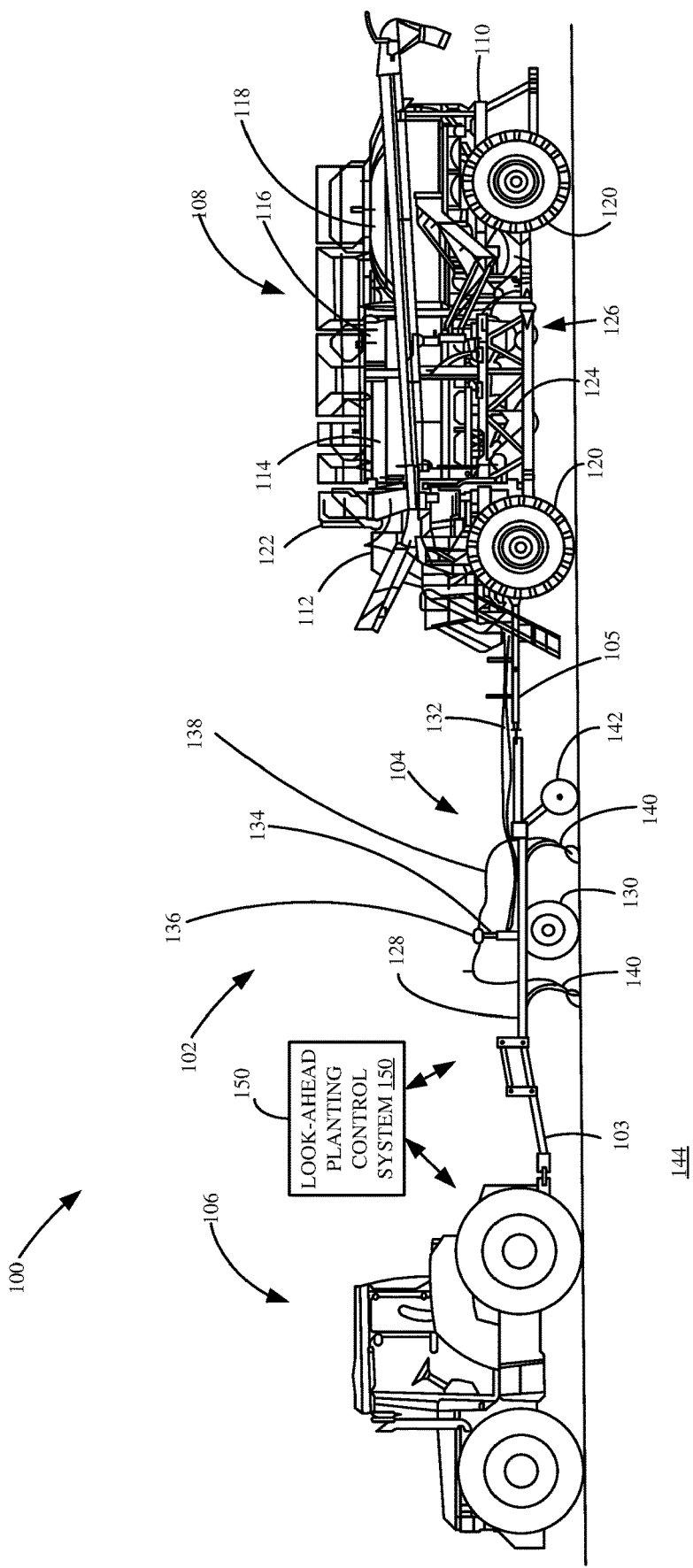
FIG. 1 is a partial pictorial, partial block diagram illustrating an agricultural system in which an air seeder is towed by a tractor.

As discussed above, some planters employ curve compensation functionality in an attempt to maintain a relatively constant seed rate, even as a seeding tool navigates around a curve. The instantaneous yaw rate sensed on the frame of the planter may be used to vary the planting rate (or application rate of other material). As described herein, the yaw of a machine is the rotation of that machine around its yaw axis, changing the heading of the machine to the left or right of its direction of motion. The yaw rate is the angular velocity of the yaw. The yaw rate on the planter itself may provide adequate performance for planters, because, when the seed is placed in the furrow using a seed tube the seed drops from the meter into the seed furrow in a fraction of a second. The seed may be placed even more quickly when using an active seed delivery system.

However, on an air seeder, it can take between 3 and 7 seconds (or more) for the seed to travel from the meter on the air cart to the seed furrow. Therefore, using the instantaneous yaw rate of the seeding tool frame to vary the seeding rate provides inadequate performance because by the time the seed travels from the meter to the furrow, the seeding tool has traveled 3 to 7 seconds along its path. For example, when traveling at 5 mph, the towing vehicle travels approximately 35 feet in 10 seconds. Therefore, if the seeding tool is being used to seed around the perimeter of the field, the instantaneous yaw rate on the tool itself is unacceptable because the seeding tool may have already passed through the turn and be running straight by the time the seed reaches the furrow. Thus, the variation in seed rate is not applied during the turn, but after the turn. The result is that, during the turn, the inside of the curve is over-seeded and the outside of the curve is under-seeded. During the exit from the turn, the seed distribution is uneven across the tool for a time that is equivalent to the duration of the turn.

The present description thus describes a system that senses the instantaneous yaw rate on the towing vehicle and generates a predicted yaw rate of the tool at a look-ahead time in the future. Depending on the speed of the towing vehicle and the distance between the yaw rate sensor on the towing vehicle and the work point of the implement being towed, for which the yaw rate is being predicted, the instantaneous yaw rate of the towing vehicle may be used as the predicted yaw rate (adjusted for the variation in speed across the seeding tool). However, in other configurations, such as where the seeding tool is towed behind the air cart, the work point of the tool arrives at the location of the tractor much later than when the seeding tool is towed between the towing vehicle and the air cart. In that case, the present description describes a system which predicts the yaw rate across the seeding tool in a way that accommodates for the extra distance between the seeding tool and the towing vehicle. For example, the present description describes a system which may aggregate a set of instantaneous yaw rate values from the yaw rate sensor on the tractor (such as a rolling table of yaw rate values) which can then be used to predict a yaw rate across the seeding tool at a time in the future when the seeding tool reaches the location where the instantaneous values of the towing vehicle were taken. These and other techniques for predicting a yaw rate value across the seeding tool can be used. The seed rate (or other application rate) can then be controlled across the seeding tool based upon the predicted yaw rate across the seeding tool.

The present description will proceed with respect to the application tool being an air seeder that has an air cart and a seeding tool. The air cart has a meter and delivery system that meters and delivers seed to different work points on the seeding tool, where furrows are opened by openers on the seeding tool. However, the application tool could be an implement that applies fertilizer or other material as well.

FIG. 1 is a side view of an example of an agricultural system 100 which includes an agricultural implement, in particular an air or pneumatic seeder 102. In the example shown in FIG. 1, the seeder 102 comprises a tilling implement (or seeding tool) 104 (also sometimes called a drill) towed between a tractor (or other towing vehicle) 106 and a commodity cart (also sometimes called an air cart) 108. The commodity cart 108 has a frame 110 upon which a series of product tanks 112, 114, 116, and 118, and wheels 120 are mounted. Each product tank has a door (a representative door 122 is labeled) releasably sealing an opening at its upper end for filling the tank with product, most usually a commodity of one type or another. A metering system 124 is provided at a lower end of each tank (a representative one of which is labeled) for controlled feeding or draining of product (most typically granular material) into a pneumatic distribution system 126. The tanks 112, 114, 116, and 118 can hold, for example, a material or commodity such as seed or fertilizer to be distributed to the soil. The tanks can be hoppers, bins, boxes, containers, etc. The term "tank" shall be broadly construed herein. Furthermore, one tank with multiple compartments can also be provided instead of separated tanks.

The tilling implement or seeding tool 104 includes a frame 128 supported by ground wheels 130. Frame 128 is connected to a leading portion of the commodity cart 108, for example by a tongue style attachment (not labeled). The commodity cart 108 as shown is sometimes called a "tow behind cart," meaning that the cart 108 follows the tilling implement 104. In an alternative arrangement, the cart 108 can be configured as a "tow between cart," meaning the cart 108 is between the tractor 106 and tilling implement 104. In yet a further possible arrangement, the commodity cart 108 and tilling implement 104 can be combined to form a unified rather than separated configuration. These are just examples of additional possible configurations. Other configurations are even possible and all configurations should be considered contemplated and within the scope of the present description.

In the example shown in FIG. 1, tractor 106 is coupled by couplings 103 to seeding tool 104 which is coupled by couplings 105 to commodity cart 108. The couplings 103 and 105 can be mechanical, hydraulic, pneumatic, and electrical couplings and/or other couplings. The couplings 103 and 105 can include wired and wireless couplings as well.

The pneumatic distribution system 126 includes a fan (not shown) connected to a product delivery conduit structure having multiple product flow passages 132. The fan directs air through the flow passages 132. Each product metering system 124 controls delivery of product from its associated tank at a controllable rate to the transporting airstreams moving through flow passages 132. In this manner, each flow passage 132 carries product from the tanks to a secondary distribution tower 134 on the tilling implement 104. Typically, there will be one tower 134 for each flow passage 132. Each tower 134 includes a secondary distributing manifold 136, typically located at the top of a vertical tube. The distributing manifold 136 divides the flow of product into a number of secondary distribution lines 138. Each secondary distribution line 138 delivers product to one of a plurality of ground engaging tools 140 (also known as ground openers) that define the locations of work points on seeding tool 104. The ground engaging tools 140 open a furrow in the soil 144 and facilitates deposit of the product therein. The number of flow passages 132 that feed into secondary distribution may vary from one to eight or ten or more, depending at least upon the configuration of the commodity cart 108 and tilling implement 104. Depending upon the cart and implement, there may be two distribution manifolds 136 in the air stream between the meters 124 and the ground engaging tools 140. Alternatively, in some configurations, the product is metered directly from the tank or tanks into secondary distribution lines that lead to the ground engaging tools 140 without any need for an intermediate distribution manifold. The product metering system 124 can be configured to vary the rate of delivery of seed to each work point on tool 104 or to different sets or zones of work points on tool 104. The configurations described herein are only examples. Other configurations are possible and should be considered contemplated and within the scope of the present description.

A firming or closing wheel 142 associated with each ground engaging tool 140 trails the tool and firms the soil over the product deposited in the soil. In practice, a variety of different types of tools 140 are used including, but not necessarily limited to, tines, shanks and disks. The tools 140 are typically moveable between a lowered position engaging the ground and a raised position riding above the ground. Each individual tool 140 may be configured to be raised by a separate actuator. Alternatively, multiple tools 140 may be mounted to a common component for movement together. In yet another alternative, the tools 140 may be fixed to the frame 128, the frame being configured to be raised and lowered with the tools 140.

Examples of air or pneumatic seeder 102 described above should not be considered limiting. The features described in the present description can be applied to any seeder configuration, or other material application machine, whether specifically described herein or not.

FIG. 1 also shows that agricultural system 100 includes look-ahead planting control system 150. System 150 senses the yaw rate on tractor 106 and uses that yaw rate to predict the yaw rate across the frame 128 of implement 104, at the different work points where seeds are delivered to the furrows. System 150 is described in greater detail below.

It will be appreciated, that different portions of system 150 can reside on tractor 106, on tool or implement 104, and/or on air cart 108, or all of the elements of system 150 can be located at one place (e.g., on tractor 106). Elements of system 150 can be distributed to a remote server architecture or in other ways as well.

Figure 2:
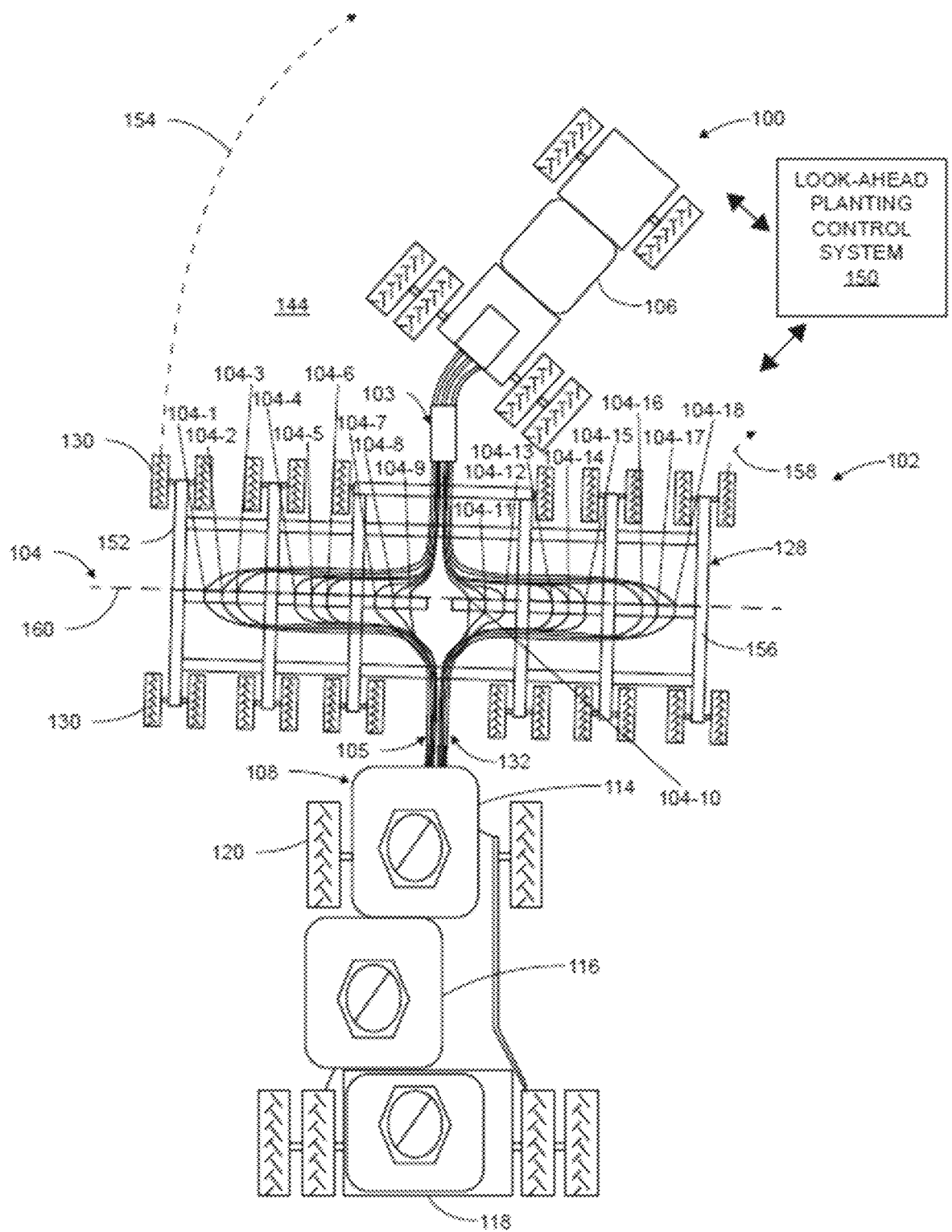
FIG. 2 is a top view of an air seeder in which the seeding tool is between the towing vehicle and the air cart.

FIG. 2 is a top view of agricultural system 100, in which some items are similar to those shown in FIG. 1 and are similarly numbered. FIG. 2 shows that implement 104 has a plurality of work points 104-1 to 104-18 distributed along a transverse axis 160 of implement 104. FIG. 2 also shows that tractor 106 has now turned at an angle relative to implement 104. Thus, when implement 104 travels forward, a first end 152 of implement 104 will travel along an outside of a curve generally along the path indicated by arrow 154. A second end 156 of implement 104 will travel along the inside of a curve generally indicated by arrow 158. Therefore, the first portion 152 of implement 104 will be traveling more quickly over the ground 144 than the second portion 156. In that case, look-ahead planting control system 150 uses the yaw rate sensed on tractor 106 to predict the yaw rate at the different work points 104-1 to 104-18 across the transverse axis 160 of implement 104 so that the seeding rate (or other application rate) from air cart 108 across implement 104 can be controlled to more closely conform to a uniform application rate, even through the curve. In the example shown FIG. 2, implement 104 is coupled between tractor 106 and air cart 108. Therefore, depending on the speed of tractor 106, and the distance from the yaw rate sensor 106 to the work points 104-1 to 104-18, it may be that the sensed yaw rate on tractor 106 can be used to predict the yaw rate across the work points on the frame 128 of implement 104.

Figure 3:
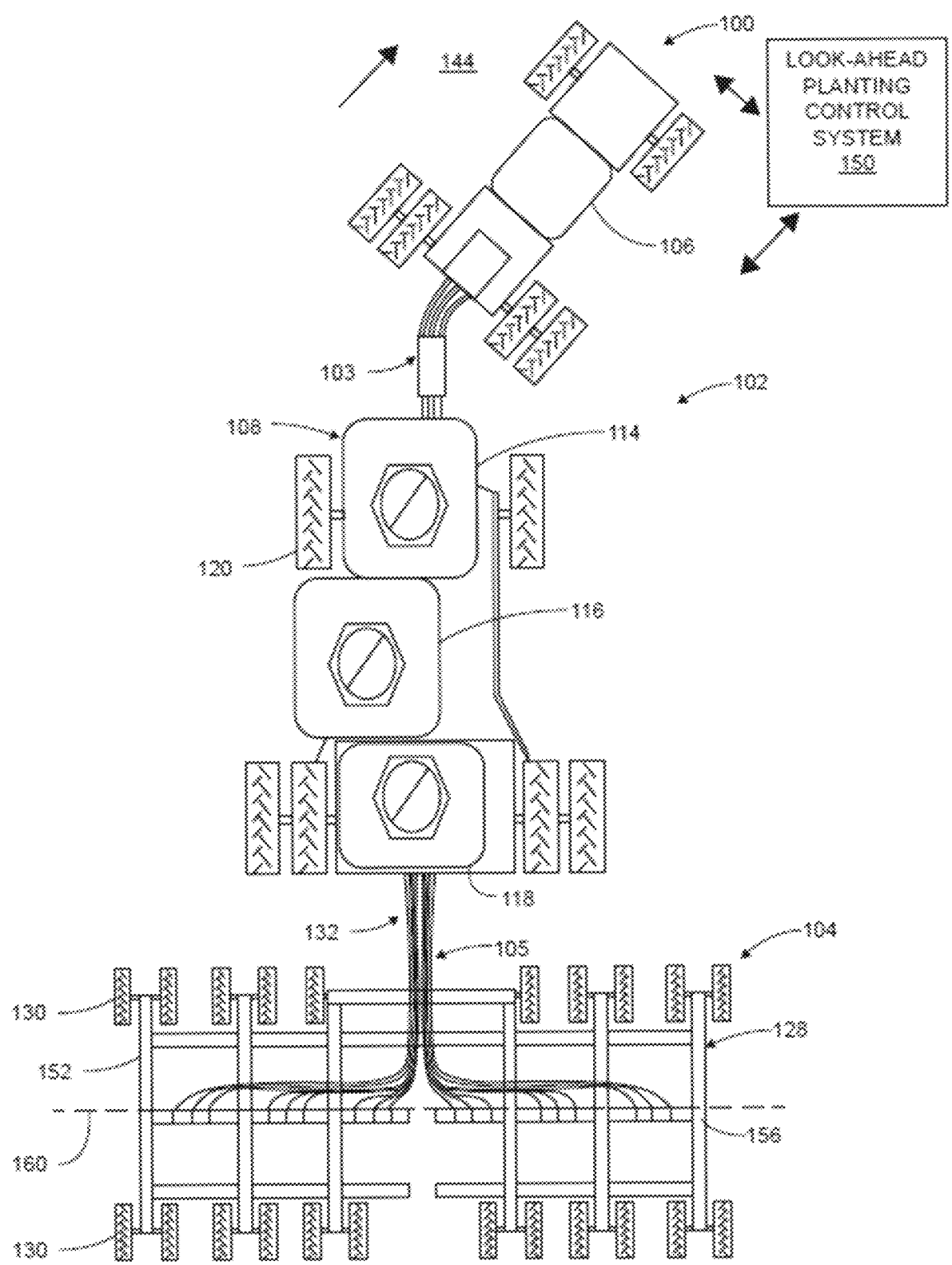
FIG. 3 is a top view of an air seeder in which the seeding tool is towed by the air cart, which is, itself, towed by the tractor.

FIG. 3 shows a top view of an agricultural system 100 which is similar to that shown in FIG. 2, and in which similar items are similarly numbered. However, in FIG. 3, it can be seen that implement 104 is now towed behind air cart 108 so that the delay between when tractor 106 travels over ground and when the work points 104-1 to 104-18 on implement 104 reaching that position on the ground 106 is greater than that delay for the configuration shown in FIG. 2. Therefore, in the configuration shown in FIG. 3, look-ahead planting control system 150 may use a set of instantaneous yaw rate values sensed on tractor 106 in order to predict the yaw rate across the work points on the transverse axis 160 of implement 104.

In the various configurations shown in FIGS. 1-3, the yaw rate predicted across the work points 104-1 to 104-18 along the transverse axis 160 of implement 104 can be used to control the metering systems on air cart 108 so that the seed is metered at a higher rate at the first end 152 of implement 104 and at a lower rate to the second end 156 of implement 104 while the implement 104 is traveling through the curve, in order to more closely conform to a consistent application rate through the curve.

Figure 4:
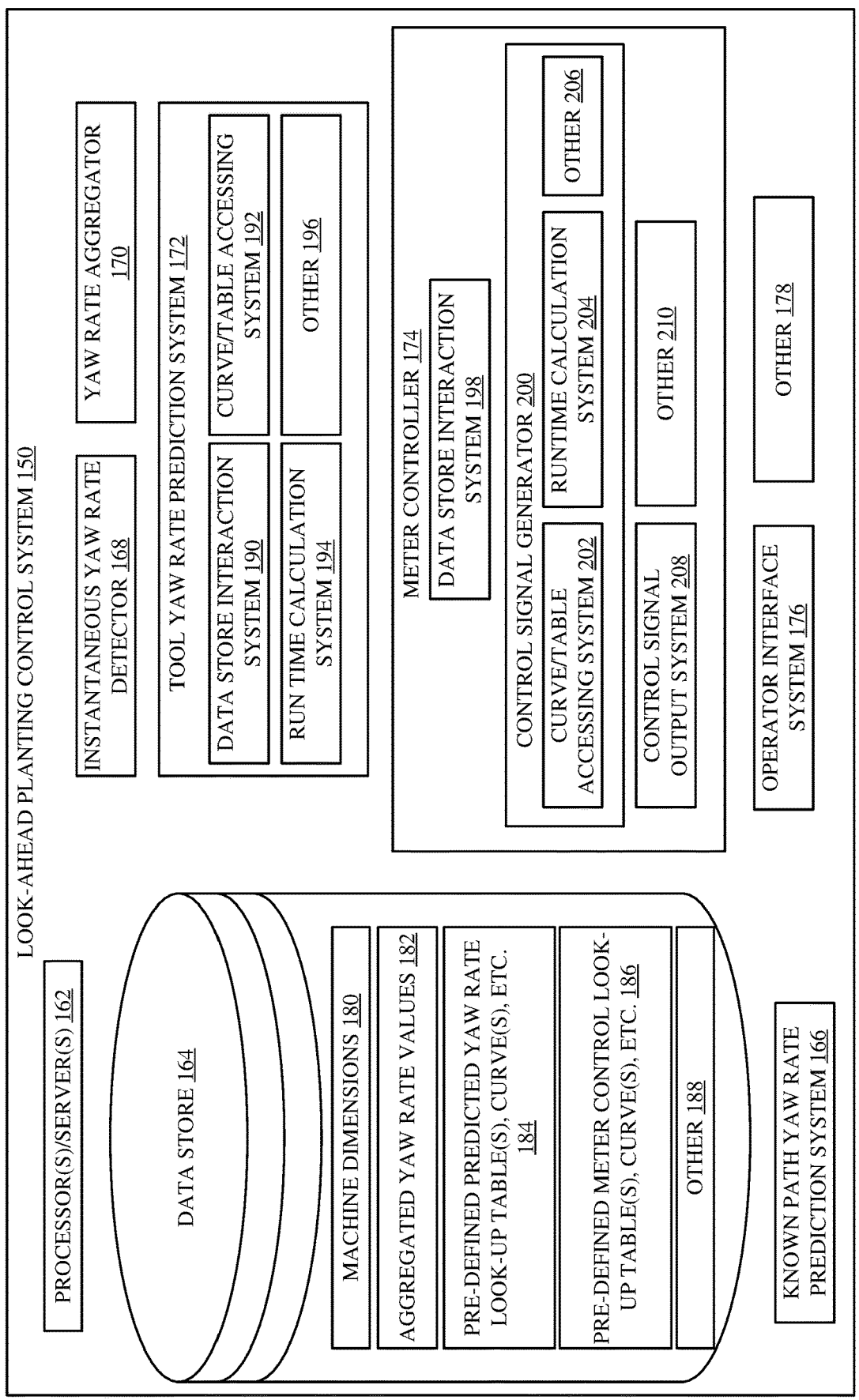
FIG. 4 is a block diagram of one example of a look-ahead planting control system.

FIG. 4 is a block diagram of one example of look-ahead planting control system 150. Again, while FIG. 4 shows an example in which all of the elements of system 150 are deployed in one spot, the elements can be distributed among the different pieces of agricultural system 100 (e.g., on tractor 106, implement 104, and air cart 108) or they can be distributed in other ways, such as to a remote server environment or otherwise. In the example shown in FIG. 4, look-ahead planting control system 150 includes one or more processors or servers 162, data store 164, known path yaw rate prediction system 166, instantaneous yaw rate detector 168, yaw rate aggregator 170, tool yaw rate prediction system 172, meter controller 174, operator interface system 176, and other items 178. Data store 164 includes machine dimensions 180, aggregated yaw rate values 182, pre-defined predicted yaw rate look-up tables, curves, etc. 184, pre-defined meter control lookup tables, curves, etc. 186, and other items 188. Tool yaw rate prediction system 172 includes data store interaction system 190, curve/table accessing system 192, run time calculation system 194, and other items 196. Meter controller 174 includes data store interaction system 198, control signal generator 200 (which, itself, includes curve/table accessing system 202, runtime calculation system 204, and other items 206), control signal output system 208, and other items 210. Before describing the overall operation of look-ahead planting control system 150 in more detail, a discussion of some of the items in system 150, and their operation, will first be provided.

Machine dimensions 180 may include the physical dimensions of implement 104 and tractor 106, such as the distance of the work points where the seed is dropped by implement 104 relative to the location of the yaw rate sensor on tractor 106 and relative to the metering system on air cart 108, etc. The machine dimensions 180 may include the transverse width of implement 104 and/or other machine dimensions.

Aggregated yaw rate values 182 may be generated by yaw rate aggregator 170 aggregating instantaneous yaw rate values sensed by instantaneous yaw rate detector 168. Detector 168, may, for instance, be an inertial measurement unit (IMU—such as an accelerometer, a gyroscope, etc.) or a global navigation satellite system (GNSS) receiver from which the yaw rate can be derived. Instantaneous rate detector 168 can be a sensor that senses a proxy of yaw rate, such as a wheel angle that senses the angle of the wheels on tractor 106, a steering wheel angle sensor that senses the angle of a steering wheel on tractor 106, an articulation angle sensor that senses an articulation angle of an articulated tractor frame, or other instantaneous yaw rate detectors that detect a variable either indicative of the instantaneous yaw rate, or the yaw rate itself. Yaw rate aggregator 170 can aggregate a rolling table of instantaneous yaw rate values which can be used to predict the yaw rate at the work points 104-1 to 104-18 across the transverse axis 160 of implement 104. Those values can be stored as aggregated yaw rate values 182.

Pre-defined predicted yaw rate look-up tables or curves 184 can be look-up tables that store predicted yaw rate values across the transverse axis 160 of implement 104 based on a variety of inputs, such as based on the machine configuration (e.g., a model of the physical dimensions of various machines, the position of implement 104 relative to tractor 106 and air cart 108, the speed of tractor 106, the instantaneous yaw rate value measured at tractor 106, and other values). Those input values can be used to access a predefined correlation between the instantaneous yaw rate on tractor 106 and predicted yaw rates, such as a curve or table that gives the predicted yaw rate values at the different work points 104-1 to 104-18 across implement 104.

Once the predicted yaw rate values are known for the work points across the transverse axis 160 of implement 104, then predefined meter control look up tables or curves 186 can be accessed to identify the control signal values that will be applied to the meters on air cart 108 to control metering of seed or other applied material based upon the predicted yaw rate values on implement 104.

Tool yaw rate prediction system 172 receives the instantaneous yaw rate value or the aggregated values and predicts the yaw rate values at the work points across the transverse axis 160 of implement 104. Data store interaction system 190 can interact with data store 164 to obtain machine dimensions 180, aggregated yaw rate values 182, or other information. Curve/table accessing system 192 can access the predefined predicted yaw rate look up tables or curves 184 to identify the predicted yaw rate values across the work points on transverse axis 160 of implement 104. Runtime calculation system 194 can obtain the instantaneous yaw rate value or aggregated yaw rate values and the machine dimensions and perform a runtime calculation to obtain the predicted yaw rate values across the transverse axis 160 of implement 104. Thus, runtime calculations system 194 can calculate the predicted yaw rate values instead of having curve/table accessing system 192 look those values up in the pre-defined predicted yaw rate look up tables or curves 184.

The predicted yaw rate values are output to meter controller 174 which generate meter control signals to control the meters on air cart 108 based upon the predicted yaw rate values that are predicted across the transverse axis 160 of implement 104. Data store interaction system 198 interacts with data store 164 to obtain information so that control signal generator 200 can generate control signals, or determine which control signals to generate, for the meters on air cart 108, based upon the predicted yaw rates across the transverse axis 160 of implement 104. Curve/table accessing system 202 can access a predefined correlation between predicted yaw rate values and meter control signal values, such as the predefined meter control lookup tables/curves 186 based upon the predicted yaw rates across the work points of transverse axis 160 of implement 104 to identify a meter control signal for controlling the meters that provide commodity at those different work points across implement 104. In another example, runtime calculation system 204 can calculate the meter control signals that are to be used to control the meters based upon the predicted yaw rates.

Control signal generator 200 can use other mechanisms 206 to identify the control signals in other ways as well. Control signal output system 208 then applies the control signals to the meters on air cart 108 to control the meters, based upon the predicted yaw rates, to supply seed or other commodity to the work points across the transverse access 160 of implement 104. The seed or other commodity will be provided at different rates to the different work points across the transverse access 160 as implement 104 travels through a curve, so that the material or seed can be applied to the ground at a consistent rate.

Operator interface system 176 can include operator interface mechanisms, such as a steering wheel, joysticks, pedals, levers, linkages, buttons, dials, etc. The operator interface mechanisms can include one or more display screens, speakers, and other audio, visual, and/or haptic devices. Operator interface system 176 can control the operator interface mechanisms to generate a display or other output indicative of how the predicted yaw rates are generated, how the meter control signals are generated, the value of the predicted yaw rates and meter control signals, or other information indicative of the seed rate (or other application rate) that is being varied across the transverse access 160 of implement 104 in order to accomplish a consistent seed rate on the ground, even when implement 104 is moving through a curve.

Before describing the operation of system 100 in more detail, it will first be noted that, in some examples, tractor 106 will be autonomously or otherwise automatically controlled to follow a known path, at a known speed. It such an example, known path yaw rate prediction system 166 can generate the predicted future yaw rate values on tool 104 given the known path and the known speed. However, in other scenarios, the towing vehicle 106 will not be operated automatically or autonomously according to a known path at a known speed. Instead, towing vehicle 106 may be manually controlled or it may be at least manually controlled through turns. In these scenarios, system 150 generates the predicted yaw rate values as described below.

Figure 5:
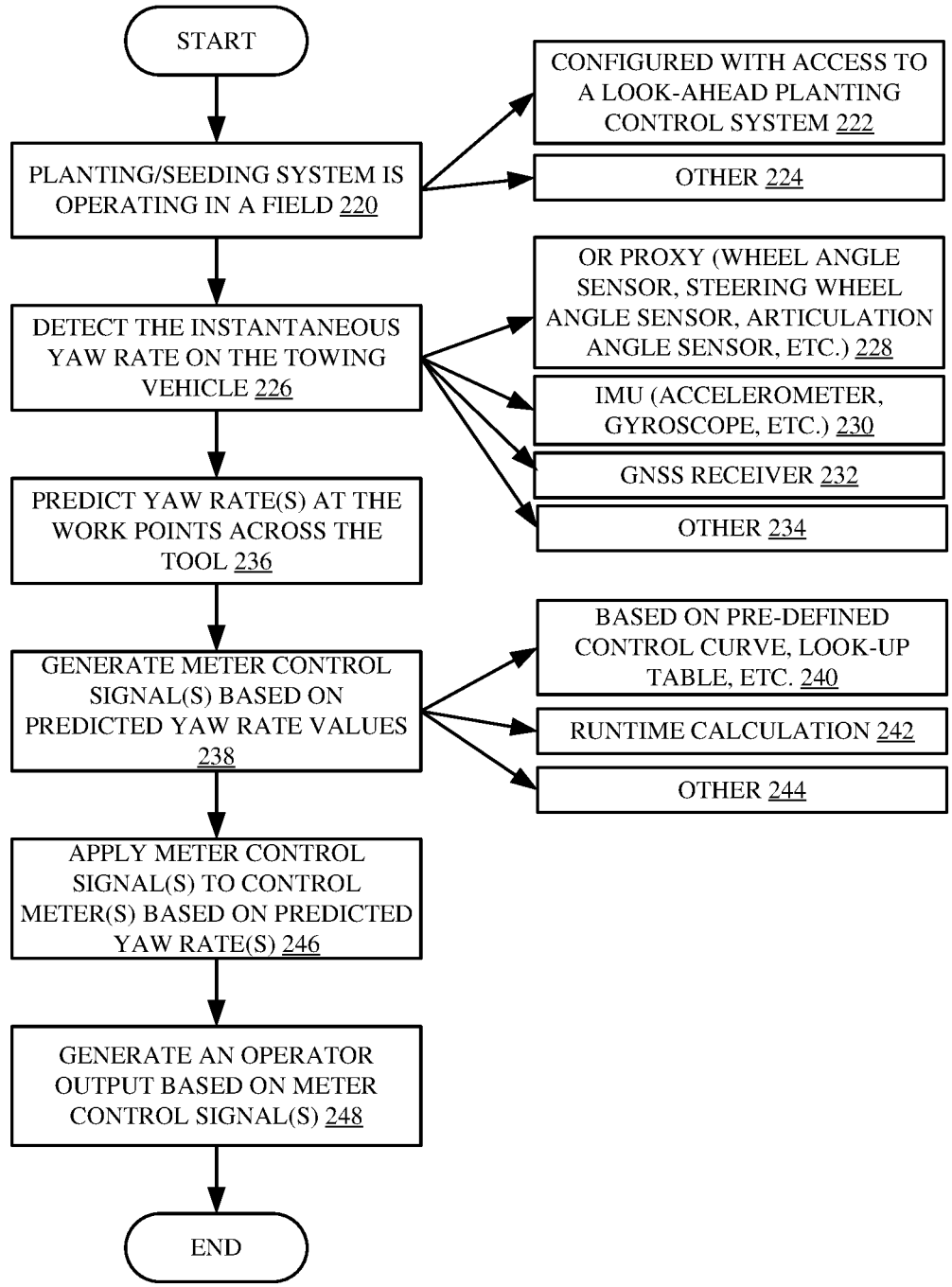
FIG. 5 is a flow diagram illustrating one example of the operation of the look-ahead planting control system.

FIG. 5 is a flow diagram illustrating one example of the operation of the agricultural system 100 in controlling seed rate of an air seeder as it is traveling through a curve. It is first assumed that a planting/seeding system, such as an air seeder, a fertilizer, etc. is operating in a field, as indicated by block 220 in the flow diagram of FIG. 5. The planting/seeding system is illustratively configured with access to a look-ahead planting control system 150, as indicated by block 222. As discussed above, the planting/seeding system can access the look-ahead planting control system 150 in a remote server architecture, or in other distributed environment, or the system 150 can be fully deployed on tractor 106 or elsewhere. The planting/seeding system can be operating in a field in other ways as well, as indicated by block 224.

The instantaneous yaw rate detector 168 then detects an instantaneous yaw rate on the towing vehicle, such as tractor 106, as indicated by block 226 in the flow diagram of FIG. 5. A proxy of the instantaneous yaw rate can be detected as well, such as by using a wheel angle sensor that senses the angle of one or more of the wheels on tractor 106, a steering wheel angle sensor that senses the angle of the steering wheel on tractor 106, an articulation angle sensor that senses the articulation angle of an articulated frame on tractor 106, or other proxy values, as indicated by block 228. The instantaneous yaw rate detector 168 can be an inertial measurement unit, such as an accelerometer or gyroscope, as indicated by block 230. The instantaneous yaw rate detector 168 can be a global navigation satellite system GNSS) receiver, as indicated by block 232. The instantaneous yaw rate on the towing vehicle can be detected in other ways, using other sensors as well, as indicated by block 234.

Tool yaw rate prediction system 172 then predicts the yaw rates at the work points across the transverse axis 160 of tool 104, as indicated by block 236 in the flow diagram of FIG. 5. Predicting the yaw rate values is described in greater detail below with respect to FIG. 6.

Meter controller 174 then generates meter control signals to control the seed meters or other commodity meters on air cart 108 based upon the predicted yaw rate values, as indicated by block 238 in the flow diagram FIG. 5. Curve/table accessing system 202 can access the predefined meter control look up tables or curves 186 to identify the particular meter control signals that are to be used based upon the predicted yaw rate values, as indicated by block 240. Runtime calculation system 204 can perform a runtime calculation to identify the meter control signals based upon the predictive yaw rate values, as indicated by block 242. The meter control signals can be identified and generated in other ways as well, as indicated by block 244. Control signal output system 208 then applies the meter control signals to control the meters on air cart 108 based upon the predicted yaw rate values across 104. Applying the control signals to the meters is indicated by block 246 in the flow diagram of FIG. 5.

Operator interface system 176 can then generate an operator output based upon the predicted yaw rates and/or the meter control signals, as indicated by block 248. The operator output can be a visual output showing how the meters are variably controlled as tool 104 moves through a curve. The operator output can be a graphical output, an audible output, or any of a wide variety of other outputs.

Figure 6:
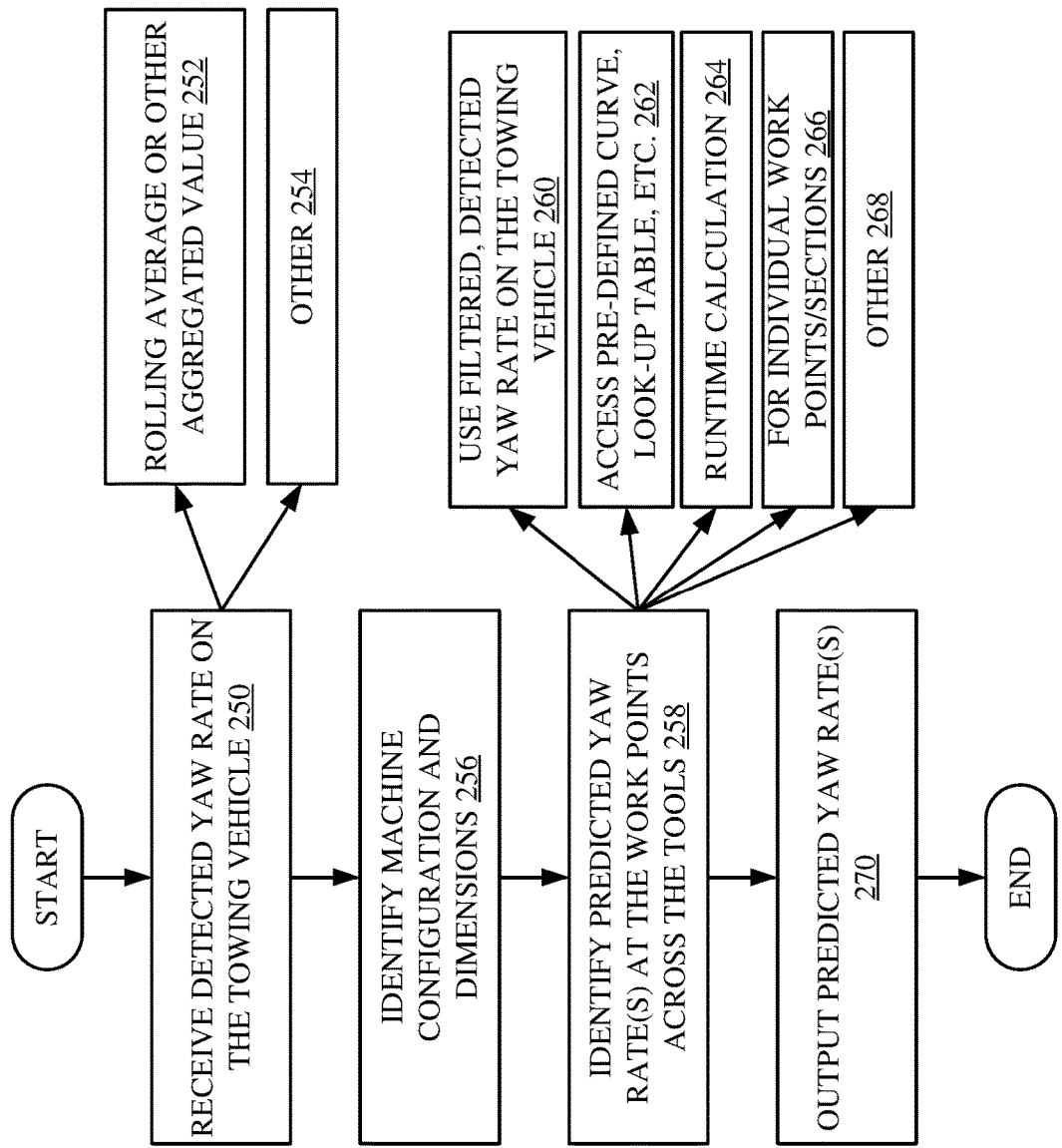
FIG. 6 is a flow diagram illustrating one example of how a future yaw rate is predicted across a planting tool.

FIG. 6 is a flow diagram illustrating one example of how tool yaw rate prediction system 172 predicts the yaw rates at the work points across the transverse axis 160 of tool 104, based upon the instantaneous yaw rate detected on tractor 106, in more detail. It is first assumed that tool yaw rate prediction system 172 receives the detected yaw rate values on the towing vehicle 106, as indicated by block 250 in the flow diagram of FIG. 6. The yaw rate that is received may be the instantaneous yaw rate generated by instantaneous yaw rate detector 168, or a rolling average of yaw rate values, or another aggregation of yaw rate values generated by yaw rate aggregator 170, as indicated by block 252 in the flow diagram of FIG. 6. The yaw rate can be received in other ways as well, as indicated by block 254.

Data store interaction system 190 can then access data store 164 to identify the machine configuration and dimensions which can then be used by tool yaw rate prediction system 172 to identify the predicted yaw rate values. Identifying the machine configuration and dimensions is indicated by block 256 in the flow diagram of FIG. 6.

Tool yaw rate prediction system 172 then identifies the predicted yaw rate values at the work points across the transverse axis 160 of tool 104, as indicated by block 258.

Depending upon the speed of the towing vehicle 106 (which may be detected by vehicle speed detector, a GNSS receiver, etc.) and depending upon the machine configuration (such as how far behind the towing vehicle 106 the work points on implement 104 are located), it may be that runtime calculation system 194 simply uses a filtered, detected yaw rate value from the towing vehicle 106, as the predicted yaw rate value on the tool 104, and adjusted based upon the location of the work points across the transverse axis 160. Using a filtered, detected yaw rate on the towing vehicle 106, as the predicted value, is indicated by block 260 in the flow diagram of FIG. 6.

In another example, curve/table accessing system 192 can access the predefined predicted yaw rate lookup tables and/or curves 184 based upon the instantaneous yaw rate value generated by detector 168 and/or the aggregated values generated by aggregator 170 to identify the predicted yaw rates at the work points across tool 104. Accessing the predefined curve or lookup tables 184 is indicated by block 262 in the flow diagram of FIG. 6. In another example, runtime calculation system 194 can perform a runtime calculation to identify the predicted yaw rate values at the work points across tool 104, as indicated by block 264.

It will also be noted that tool yaw rate prediction system 172 can generate the predicted yaw rate values for individual work points across tool 104, or for sections of work points across tool 104, as indicated by block 266. The predicted yaw rate values can be identified in other ways as well, as indicated by block 268.

Tool yaw rate prediction system 172 then outputs the predicted yaw rate values to meter controller 174 for control of the meters on air seeder 108. Outputting the predicted yaw rate values is indicated by block 270 in the flow diagram of FIG. 6.

It can thus be seen that the present system uses the instantaneous yaw rate detected on the towing vehicle (or an aggregated set of those values) to predict the yaw rate values at work points across the seeding tool. These yaw rates can then be used to identify meter control signals that are applied to the meters providing material to those work points so that the material application rate can be consistently controlled, even around curves. It will also be noted that, instead of generating predictive yaw rates for the work points, the predefined predicted curves and tables 184 and 186 can be combined so that, given an instantaneous yaw rate, or an aggregated set of instantaneous yaw rate values, the meter control signals can be directly obtained without first obtaining the predicted yaw rate values and then obtaining the control signal values.

It will also be noted that different yaw rate look-up tables or curves can be generated for different seeding configurations, for different size seeders, for different models of seeders, or for other variations. Also, different meter control look-up tables and curves 186 can be generated for different models of meters, for different seeders, or for different seeder configurations or other variations.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface displays have been discussed. The displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 7:
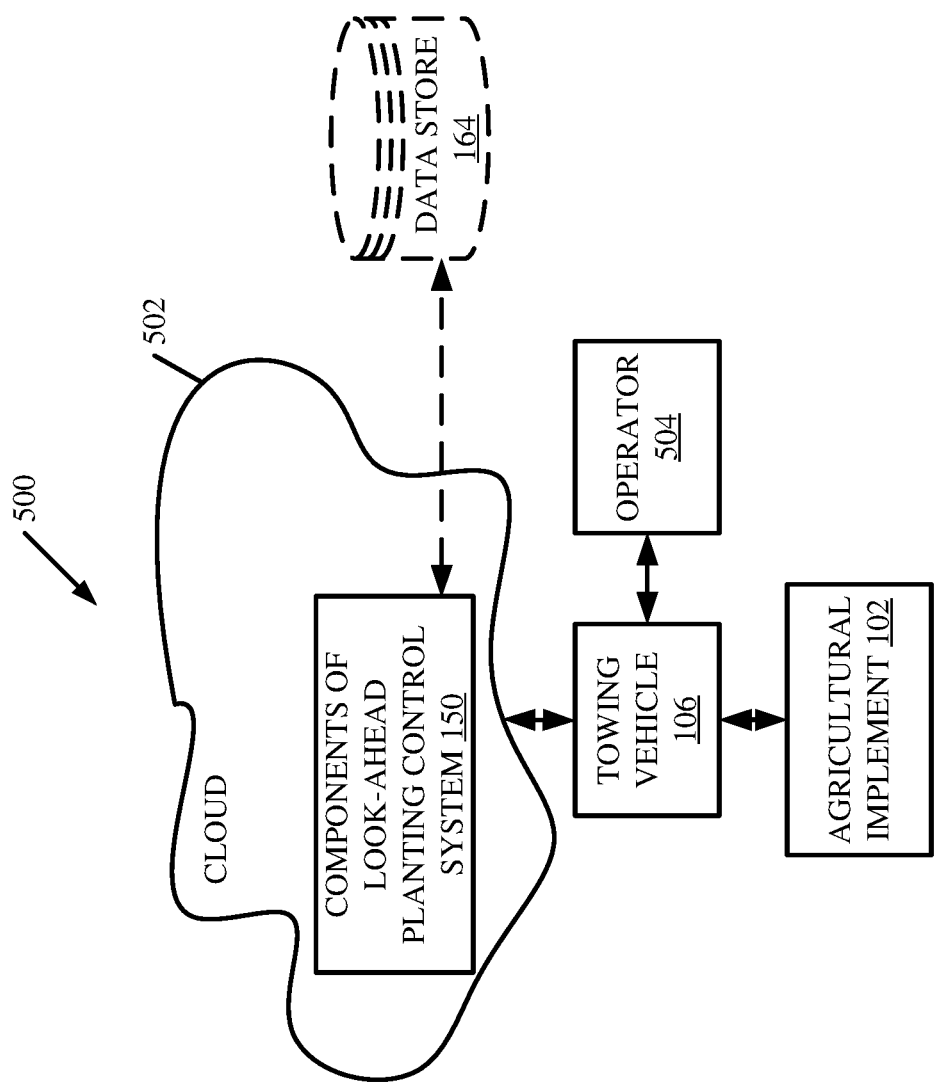
FIG. 7 is a block diagram of one example of a remote server architecture.

FIG. 7 is a block diagram of system 100, shown in FIG. 1, except that system 100 communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 7, some items are similar to those shown in previous FIGS. and they are similarly numbered. FIG. 7 specifically shows that system150 can be located at a remote server location 502. Therefore, system 100 accesses those systems through remote server location 502.

FIG. 7 also depicts another example of a remote server architecture. FIG. 7 shows that it is also contemplated that some elements of previous FIGS are disposed at remote server location 502 while others are not. By way of example, data store 164 or tool yaw rate prediction system 172 can be disposed at a location separate from location 502, and accessed through the remote server at location 502. Regardless of where they are located, they can be accessed directly by system 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the tractor comes close to the fuel truck for fueling, the system automatically collects the information from the tractor using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the tractor until the tractor enters a covered location. The tractor, itself, can then send the information to the main network.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
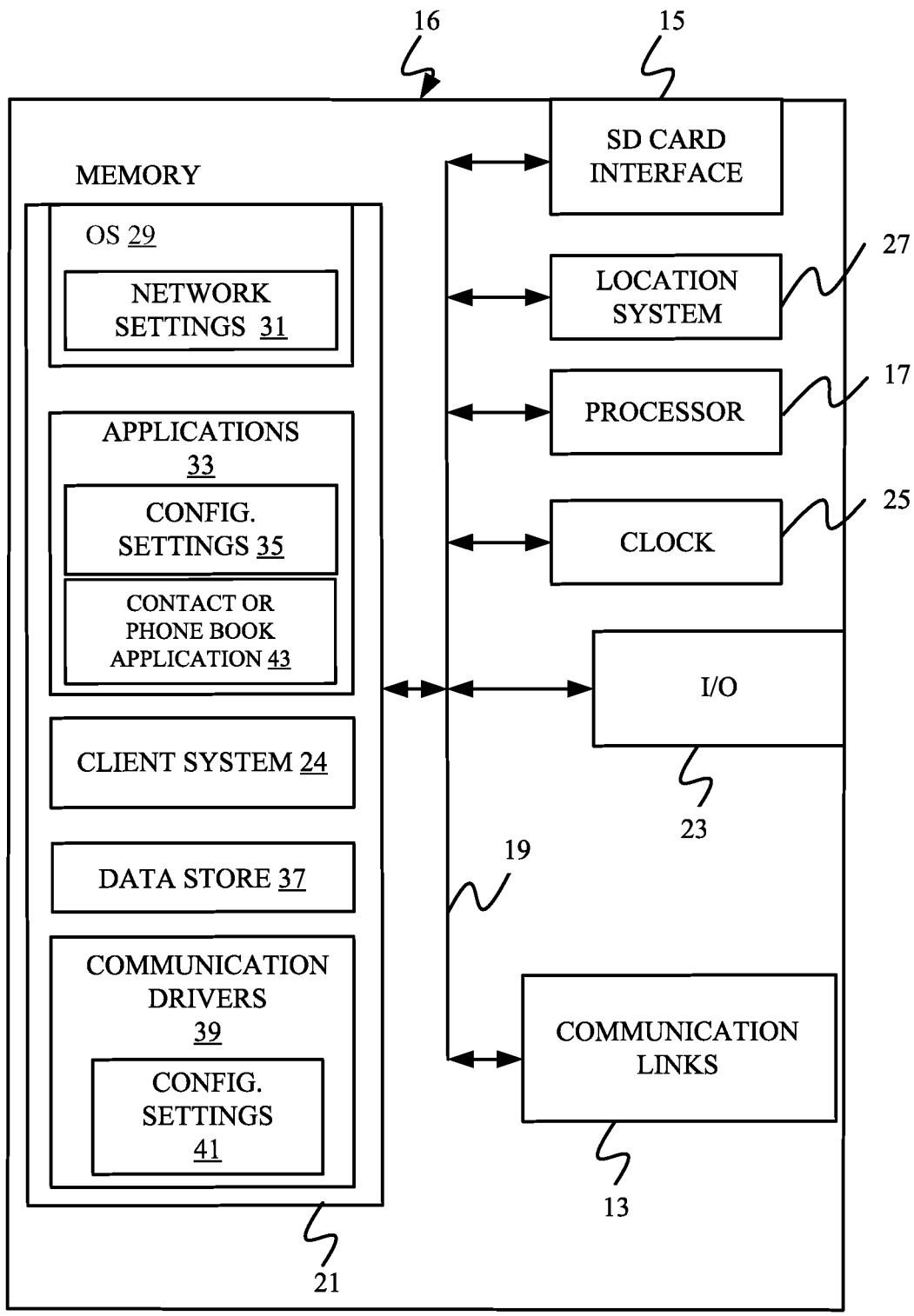
FIGS. 8-10 show examples of mobile devices that can be used in the systems and architectures shown in the previous FIGS.
Figure 9:
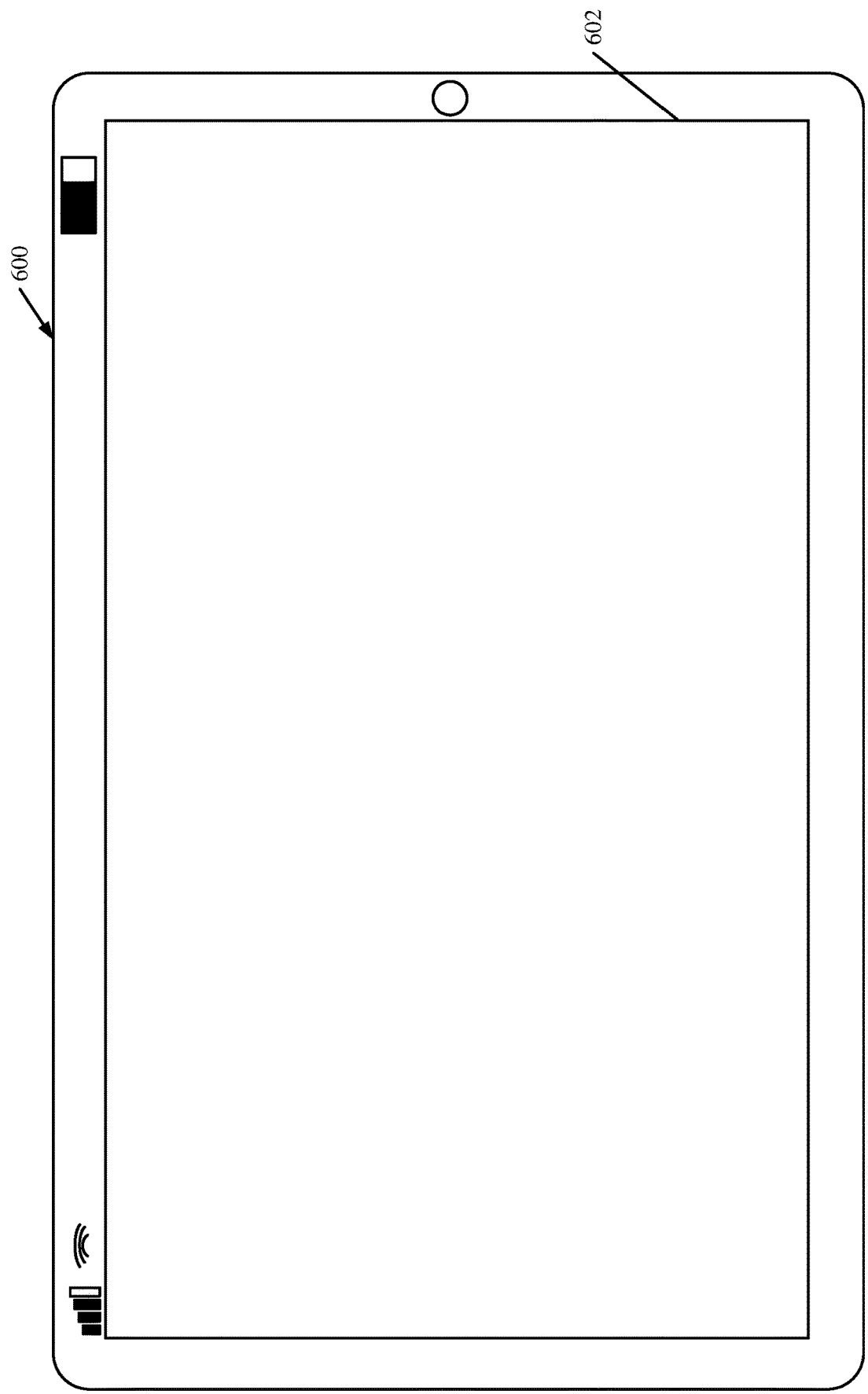
Figure 10:
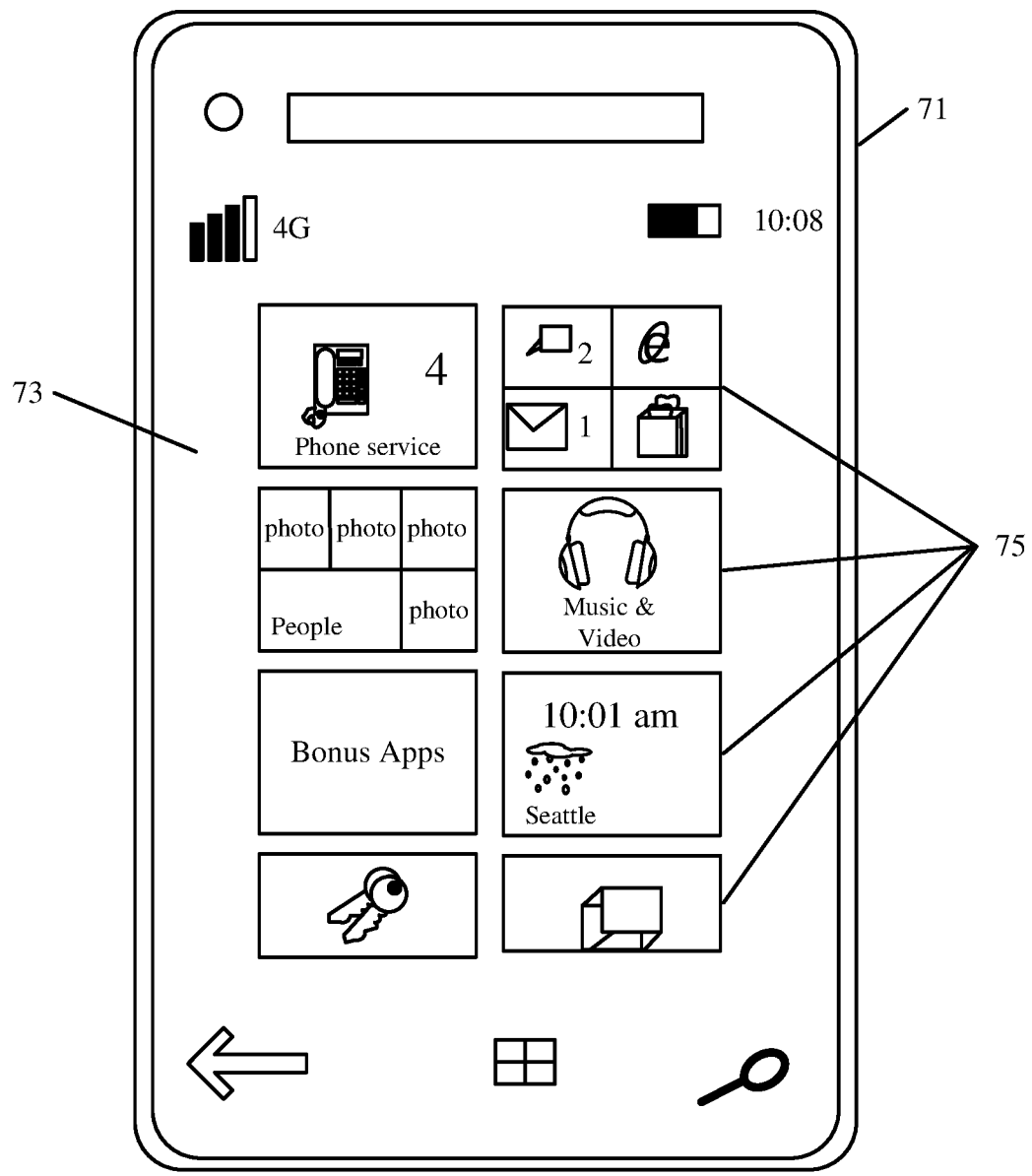

FIG. 8 is a simplified block diagram of one illustrative example of a handheld or mobile computing device that can be used as a user's or client's hand held device 16, in which the present system (or parts of it) can be deployed. For instance, a mobile device can be deployed in the operator compartment of tractor 106 for use in generating, processing, or displaying the yaw rate or meter control data. FIGS. 9-10 are examples of handheld or mobile devices.

FIG. 8 provides a general block diagram of the components of a client device 16 that can run some components shown in previous FIGS., that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. System 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 9 shows one example in which device 16 is a tablet computer 600. In FIG. 9, computer 600 is shown with user interface display screen 602. Screen 602 can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
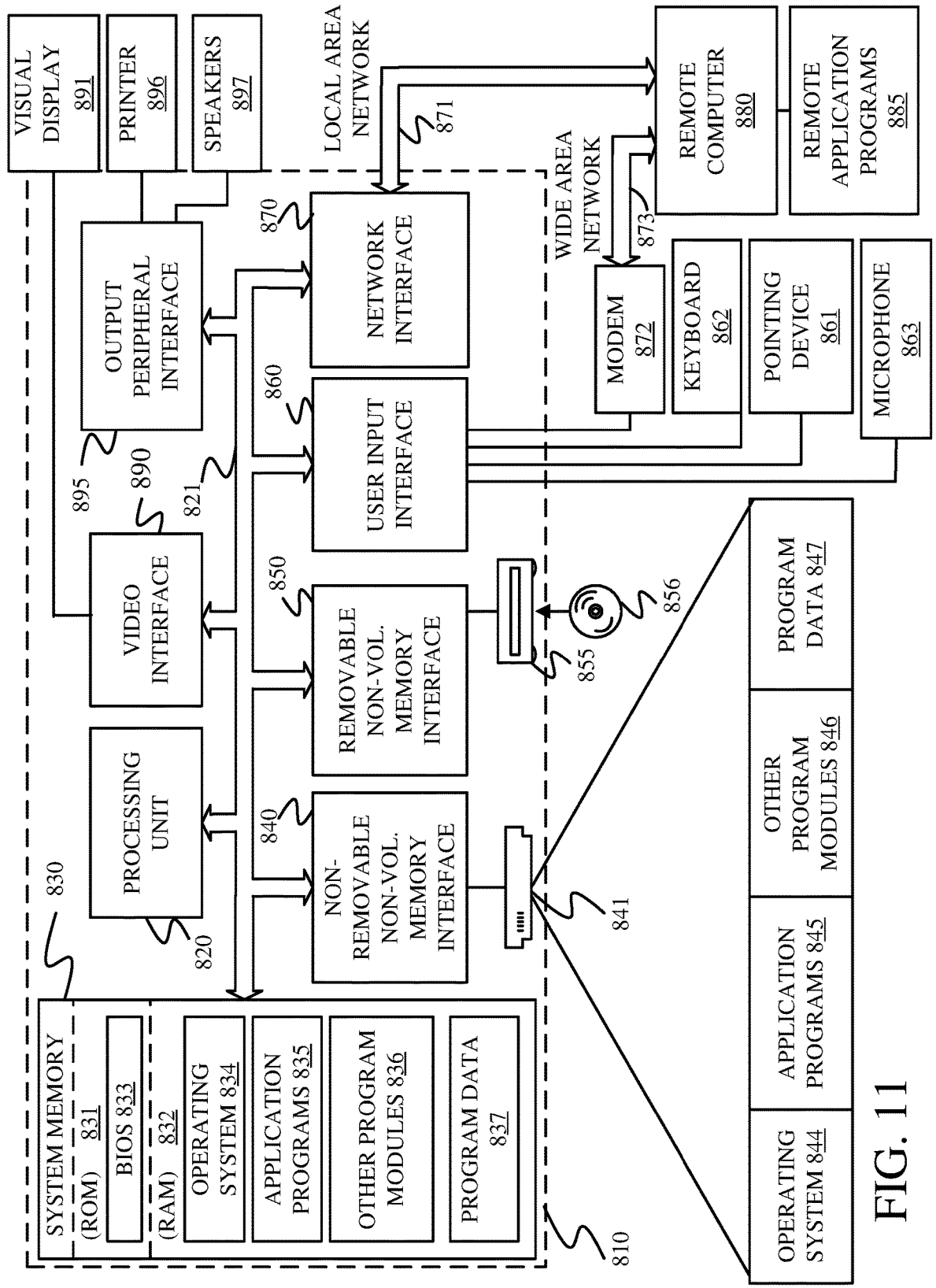
FIG. 11 is a block diagram of one example of a computing environment that can be used in the systems and architectures shown in the previous FIGS.

FIG. 11 is one example of a computing environment in which elements of previous FIGS., or parts of it, (for example) can be deployed. With reference to FIG. 11, an example system for implementing some embodiments includes a general-purpose computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 11 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural system, comprising:
   a towing vehicle;
   an agricultural machine, coupled to the towing vehicle, including an application tool that applies material to a field at work points distributed along a transverse axis of the application tool;
   an instantaneous yaw rate detector detecting an instantaneous yaw rate of the towing vehicle;
   a tool yaw rate prediction system predicting, based on the instantaneous yaw rate detected on the towing vehicle, a plurality of different yaw rate values, each predicted yaw rate value of the plurality of different predicted yaw rate values corresponding to a respective work point of a set of the work points distributed along the transverse axis of the application tool; and
   a meter controller configured to control a meter that controls a rate at which the material is provided to the work points based on the plurality of different predicted yaw rate values, wherein the meter controller comprises a curve/table accessing system configured to access a pre-defined correlation that correlates predicted yaw rate values to control signal values to obtain a control signal for the meter controller.

2. The agricultural system of claim 1 wherein the agricultural machine comprises:
   an air cart that provides the material to the application tool through the meter.

3. The agricultural system of claim 1 and further comprising:
   a yaw rate aggregator aggregating a plurality of detected instantaneous yaw rates to obtain a set of aggregated instantaneous yaw rates.

4. The agricultural system of claim 3 wherein the tool yaw rate prediction system is configured to predict, based on the set of aggregated instantaneous yaw rates, the plurality of different predicted yaw rate values.

5. The agricultural system of claim 1 wherein the tool yaw rate prediction system comprises:
   a curve/table accessing system configured to access a pre-defined correlation that correlates instantaneous yaw rate values to predicted yaw rate values to obtain the plurality of different predicted yaw rate values.

6. The agricultural system of claim 1 wherein the tool yaw rate prediction system comprises:
   a runtime calculation system configured to perform a run time calculation based on the instantaneous yaw rate to obtain the plurality of different predicted yaw rate values.

7. The agricultural system of claim 1 wherein the meter controller further comprises:
   a runtime calculation system configured to perform a run time calculation based on the plurality of different predicted yaw rate values to obtain the control signal for the meter controller.

8. The agricultural system of claim 1 wherein the instantaneous yaw rate detector comprises:
   a wheel angle detector configured to detect a wheel angle of a wheel on the towing vehicle.

9. The agricultural system of claim 1 wherein the instantaneous yaw rate detector comprises:
   a steering wheel angle detector configured to detect a steering wheel angle of a steering wheel on the towing vehicle.

10. A computer-implemented method of controlling an agricultural machine, comprising:
    detecting, on a towing vehicle, an instantaneous yaw rate of the towing vehicle, the towing vehicle towing an application tool that applies material to a field at work points distributed along a transverse axis of the application tool;
    predicting, based on the instantaneous yaw rate detected on the towing vehicle, a plurality of different yaw rate values, each predicted yaw rate value of the plurality of different predicted yaw rate values corresponding to a respective work point of a set of the work points distributed along the transverse axis of the application tool; and
    controlling a meter that controls a rate at which the material is provided to the work points based on the plurality of different predicted yaw rate values, wherein controlling the meter comprises accessing a pre-defined correlation that correlates predicted yaw rate values to control signal values to obtain a control signal for controlling the meter.

11. The computer-implemented method of claim 10 and further comprising:
    aggregating a plurality of detected instantaneous yaw rates to obtain a set of aggregated instantaneous yaw rates.

12. The computer-implemented method of claim 11 wherein predicting comprises:
    predicting, based on the aggregated instantaneous yaw rates, the plurality of different predicted yaw rate values.

13. The computer-implemented method of claim 10 wherein predicting comprises:
    accessing a pre-defined correlation that correlates instantaneous yaw rate values to predicted yaw rate values to obtain the plurality of different predicted yaw rate values.

14. The computer-implemented method of claim 10 wherein predicting comprises:
    performing a run time calculation based on the instantaneous yaw rate to obtain the plurality of different predicted yaw rate values.

15. The computer-implemented method of claim 10 and further comprising:
    performing a run time calculation based on the predicted yaw rate values; and
    further controlling the meter based on the run time calculation.

16. The computer-implemented method of claim 10 wherein detecting an instantaneous yaw rate of the towing vehicle comprises:
    detecting a wheel angle of a wheel on the towing vehicle.

17. The computer-implemented method of claim 10 wherein detecting an instantaneous yaw rate of the towing vehicle comprises:
- detecting a steering wheel angle of a steering wheel on the towing vehicle.

18. An agricultural system, comprising:
- a towing vehicle;
- an agricultural machine, coupled to the towing vehicle, including an application tool that applies material to a field at work points distributed along a transverse axis of the application tool;
- an instantaneous yaw rate detector detecting an instantaneous yaw rate of the towing vehicle;
- a tool yaw rate prediction system predicting, based on the instantaneous yaw rate detected on the towing vehicle, a plurality of different yaw rate values, each predicted yaw rate value of the plurality of different predicted yaw rate values corresponding to a respective work point of a set of the work points distributed along the transverse axis of the application tool, wherein the tool yaw rate prediction system is configured to access a pre-defined correlation that correlates instantaneous yaw rate values to predicted yaw rate values to obtain the plurality of different predicted yaw rate values; and
- a meter controller configured to control a meter that controls a rate at which the material is provided to the work points based on the plurality of different predicted yaw rate values.

19. A computer-implemented method of controlling an agricultural machine, comprising:
- detecting, on a towing vehicle, an instantaneous yaw rate of the towing vehicle, the towing vehicle towing an application tool that applies material to a field at work points distributed along a transverse axis of the application tool;
- predicting, based on the instantaneous yaw rate detected on the towing vehicle, a plurality of different yaw rate values, each predicted yaw rate value of the plurality of different predicted yaw rate values corresponding to a respective work point of a set of the work points distributed along the transverse axis of the application tool, wherein predicting comprises accessing a pre-defined correlation that correlates instantaneous yaw rate values to predicted yaw rate values to obtain the plurality of different predicted yaw rate values; and
- controlling a meter that controls a rate at which the material is provided to the work points based on the plurality of different predicted yaw rate values.

\* \* \* \* \*